United States Patent

Morishita

[11] Patent Number: 5,097,420
[45] Date of Patent: Mar. 17, 1992

[54] MOTOR DRIVEN POWER STEERING APPARATUS

[75] Inventor: Mitsuharu Morishita, Himeji, Japan

[73] Assignee: Mitsubishi Denki K.K., Tokyo, Japan

[21] Appl. No.: 511,692

[22] Filed: Apr. 20, 1990

[30] Foreign Application Priority Data

Apr. 22, 1989 [JP] Japan .................. 1-102831
Apr. 22, 1989 [JP] Japan .................. 1-102832

[51] Int. Cl.5 ............................................ B62D 5/04
[52] U.S. Cl. ............................ 364/424.05; 180/79.1
[58] Field of Search .............. 364/424.05; 180/79.1, 180/140, 141, 142, 143; 307/10.1, 10.7

[56] References Cited

U.S. PATENT DOCUMENTS

| 4,386,674 | 6/1983 | Sugata | 180/142 |
| 4,538,698 | 9/1985 | Hashimoto et al. | 180/142 |
| 4,621,327 | 11/1986 | Dolph et al. | 180/142 |
| 4,753,310 | 6/1988 | Hashimoto | 180/79.1 |
| 4,871,952 | 10/1989 | Ishizaka et al. | 180/142 |
| 4,878,004 | 10/1989 | Shimizu | 180/79.1 |
| 4,913,249 | 4/1990 | Lang | 180/79.1 |
| 4,957,182 | 9/1990 | Morishita et al. | 364/424.05 |
| 4,984,647 | 1/1991 | Morishita et al. | 180/79.1 |

Primary Examiner—Gary Chin
Attorney, Agent, or Firm—Sughrue, Mion, Zinn, Macpeak & Seas

[57] ABSTRACT

A motor driven power steering apparatus comprising an electric motor for assisting steering, a torque sensor for detecting steering torque, a detecting means for detecting vehicle speed or rotation speed of an engine, a resistance for limiting electric current to be supplied to an electric motor, and a relay being connected in parallel to the resistance, opens the relay when the vehicle is running at a high speed, that is, the vehicle speed or rotation speed is larger than a predetermined value thereof, limits current to be supplied to the electric motor by the resistance, makes torque generated by the electric motor smaller in the case where anything unusual is created in the apparatus at a high speed running, and makes it easier for a driver to correct the steering operation or to avoid a danger.

4 Claims, 6 Drawing Sheets

MOTOR DRIVEN POWER STEERING APPARATUS

BACKGROUND OF THE INVENTION

1. Field of the Invention

The present invention is related to a motor driven power steering apparatus which assists the steering mechanism of a vehicle by the turning force of a motor, and particularly to a motor driven power steering apparatus which improves reliability when the apparatus is in trouble.

2. Description of Related Art

Conventionally, a motor driven power steering apparatus of this kind controls the assist torque to reduce corresponding to steering load which becomes lighter as the vehicle speed increases so that the steering torque at a high speed running is not too light. Generally, gradient of the characteristic of relationship between the steering torque and motor current is so controlled as to decrease corresponding to the increase of the vehicle speed.

As a concrete method of controlling, in digital controlling which employs a microcomputer, such method that a data of characteristic of relationship between steering torque and motor current which has been previously stored in an inner memory unit as a table is read out corresponding to a vehicle speed signal inputted to the microcomputer to be controlled is employed.

On the other hand, in an analogue controlling, such method that motor current is controlled to be a predetermined value corresponding to an output signal and a vehicle speed signal of the steering torque sensor by using an operation amplifier, comparator, and various kinds of semiconductors is employed.

In either case of above digital controlling using the microcomputer or analog controlling, however, there was a big problem from a viewpoint of reliability because, when the microcomputer, operation amplifier, comparator, and semiconductors, etc. are in trouble by some reason, large current flows during high-speed running, leading to troubles that a steering wheel turns round uncontrollably in the direction against the driver's will or oversteers due to too much assist torque.

SUMMARY OF THE INVENTION

The invention has been devised to solve aforesaid problem. The primary object of the invention is to provide a motor driven power steering apparatus of high safety and reliability. It is capable of making torque generated by the motor smaller even when excess current is to flow in the similar direction, or current is to flow even in the neutral state or in the opposite direction to the steering direction due to anything unusual created during high-speed running, leading the driver not to turn the wheel too much, thereby the driver being able to correct the steering operation and avoid danger easily.

In order to attain the object, the motor driven power steering apparatus of the invention has an electric motor which assists the steering torque corresponding to the magnitude and direction of the steering torque, a judging circuit which judges whether or not the detected vehicle speed or engine rotation speed is larger than the predetermined vehicle speed or engine rotation speed, a resistance inserted in series to the electric motor, and a switching element being connected to a place between both ends of the resistance which short-circuits the resistance when a speed judging circuit judges vehicle speed or engine rotation speed to be at a low speed or low rotation speed and opens resistance when the speed judging circuit judges vehicle speed or engine rotation speed to be at a high speed or high rotation speed.

Accordingly, when the speed judging circuit judges the vehicle speed or the engine rotation speed to be at a low speed or low rotation speed, the switching element short-circuits the resistance and flows a large current through the electric motor to assist the steering to a predetermined magnitude and direction, and when the speed judging circuit judges the vehicle speed or the engine rotation speed to be at a high speed or high rotation speed, the switching element opens to insert the resistance into the electric motor in series and suppress the current of the electric motor to suppress the assisting operation of the steering.

The above and further objects and features of the invention will more fully be apparent from the following detailed description with accompanying drawings.

DESCRIPTION OF THE PREFERRED EMBODIMENTS

Figure 1:
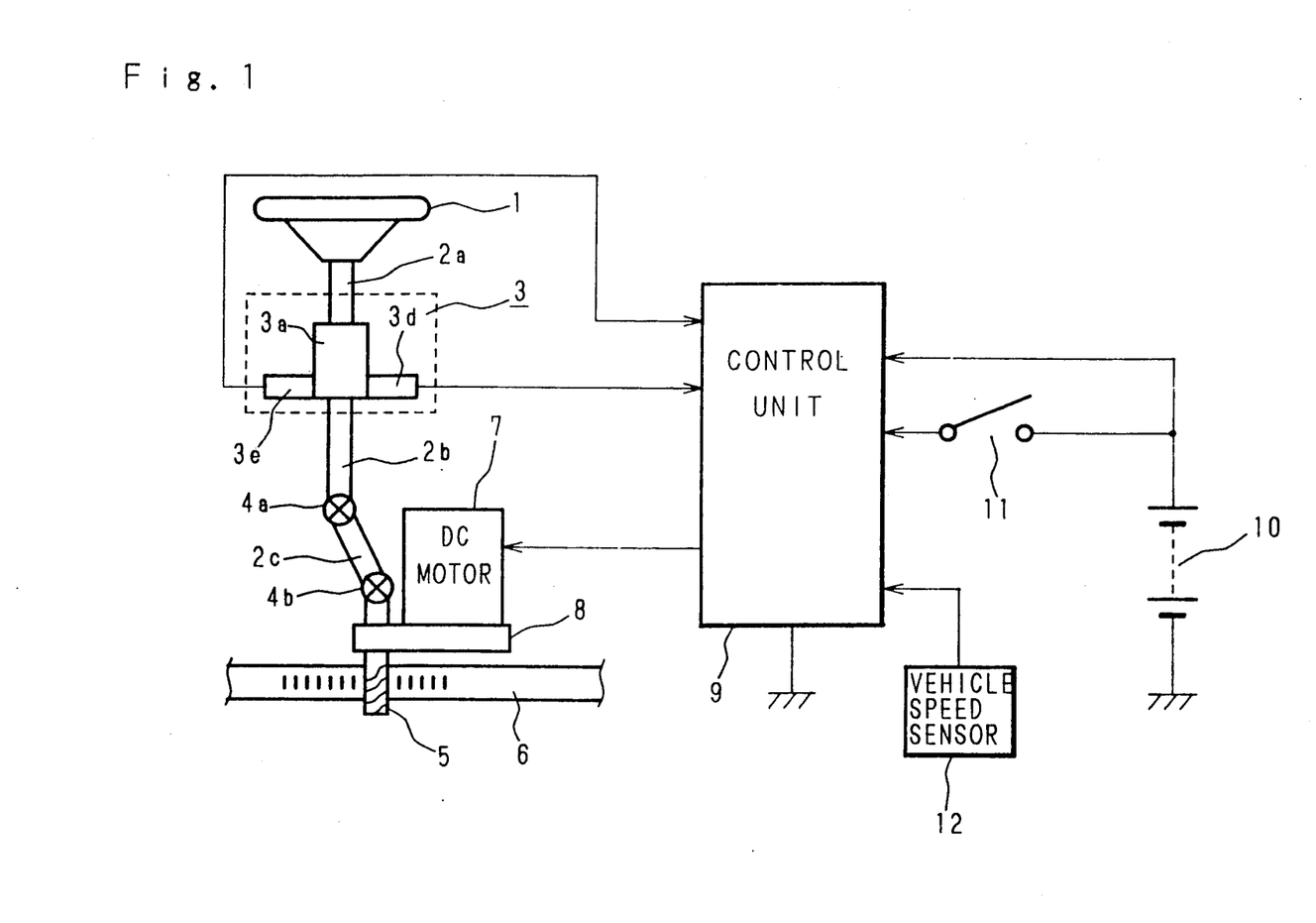
FIG. 1 is a schematic diagram of a motor driven power steering apparatus of one embodiment of the present invention.

In the following, explanation will be given on the embodiment of the motor driven power steering apparatus of the invention. FIG. 1 is a schematic construction view showing the construction of the one embodiment. In the figure, reference numeral 1 is a steering wheel which receives steering turning force from a driver. The turning force applied to the steering wheel 1 is detected by a torque sensor 3 which outputs an electric signal according to the turning force. The torque sensor 3 is composed of a torque-displacement converter 3a which converts the turning force to torsion angle displacement according to the turning force applied to the steering wheel 1, a right potentiometer 3d which outputs a right direction electric signal according to right direction angle displacement of the torque-displacement converter 3a, and a left potentiometer 3e which outputs a left direction electric signal according to left direction angle displacement of the torque-displacement converter 3a.

In addition, 2a shows a first steering shaft which connects the steering wheel 1 and the torque sensor 3, and 2b shows a second steering shaft which connects the torque sensor 3 and a first universal joint 4a.

A third steering shaft 2c is connected between the first universal joint 4a and a second universal joint 4b.

The second universal joint 4b is mechanically connected to a pinion gear shaft 5.

The pinion gear shaft 5 engages with a rack 6, and steers the wheels by the movement of the rack 6.

Still more, a DC motor 7 having shunt or field winding is provided in the vicinity of the pinion gear shaft 5. In this embodiment, the DC motor 7 of field winding is employed as an electric motor, a reducing gear 8 being connected to the axis of rotation thereof.

The reducing gear 8 drives a place between the second universal joint 4b and the pinion gear shaft 5, and connects the steering assisting turning force of the DC motor 7.

Furthermore, respective right and left direction electric signals from aforesaid right potentiometer 3d and left potentiometer 3e, that is, a right direction torque signal and a left direction torque signal are supplied to a control unit 9.

The output of a vehicle speed sensor 12 is also inputted to the control unit 9. Moreover, the control unit 9 is directly connected to a battery 10 and is connected to the positive electrode of the battery 10 through a key switch 11. The output of the control unit 9 is to drive-control the DC motor 7.

Figure 2:
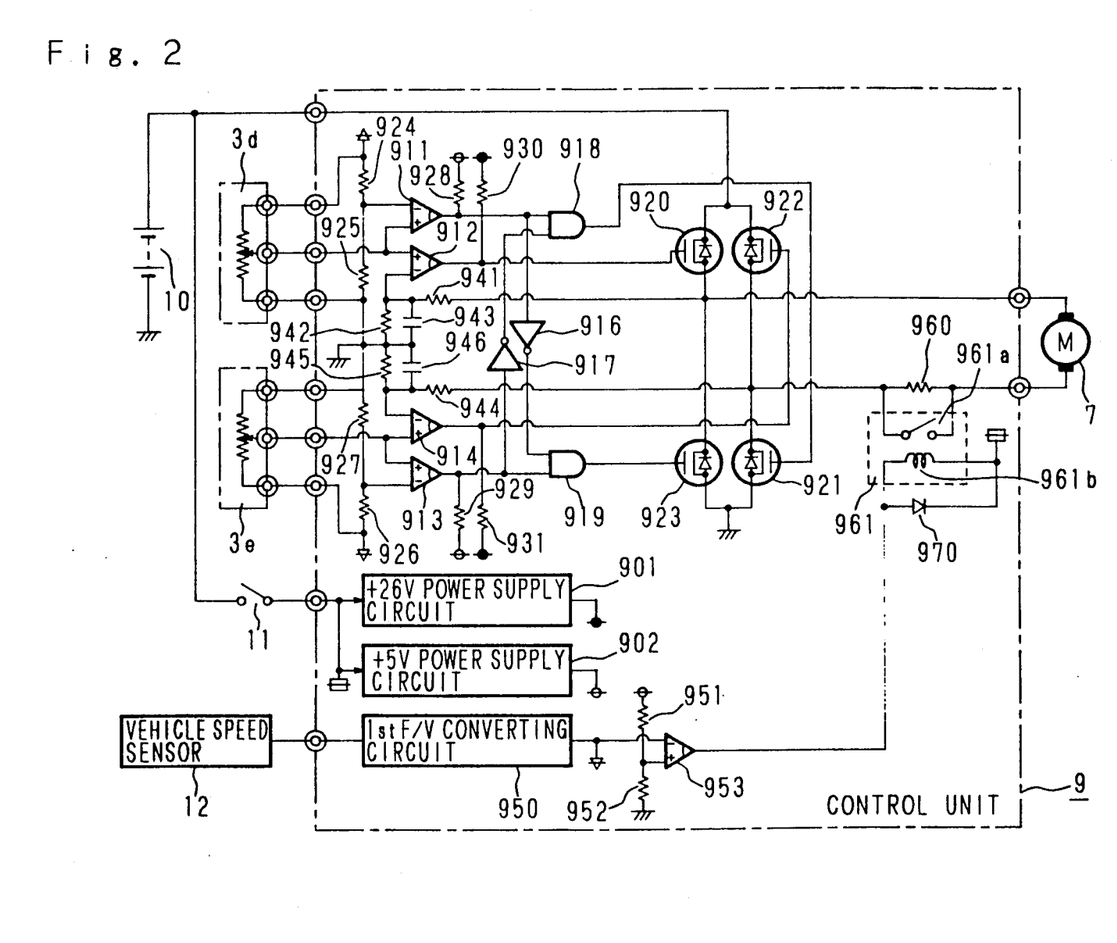
FIG. 2 is a circuit diagram showing a precise construction of the inside of a control unit.

FIG. 2 is a circuit diagram showing the precise inner configuration of the control unit 9 shown in FIG. 1.

In the figure, reference numeral 911 is a first comparator which inputs the right direction torque signal of the right potentiometer 3d to the plus input terminal thereof and inputs divided voltage of resistances 924 and 925 to the minus input terminal thereof.

In the same way, a second comparator 912 also inputs the right direction torque signal of the right potentiometer 3d to the plus input terminal thereof.

A third comparator 913 and a fourth comparator 914 input the left direction torque signals of the left potentiometer 3e to the respective plus input terminals thereof.

The third comparator 913 inputs divided voltage of resistances 926 and 927 to the minus input terminal thereof.

Aforesaid resistances 924 and 925, and resistances 926 and 927 are respectively series-connected and inserted between an output terminal of an F/V converting circuit to be described later and ground.

In addition, the minus input terminal of the second comparator 912 is grounded through a resistance 942, and the minus input terminal of the fourth comparator 914 is grounded through a resistance 945.

These resistances 942 and 945 are connected in parallel to capacitors 943 and 946 respectively.

One end of the capacitor 943 is connected through a resistance 941 to an electrode whose impress voltage of the motor is "H" when the DC motor 7 is driven to the right direction, and one end of the capacitor 946 is connected through resistances 944 and 960 to an electrode whose impress voltage of the motor is "H" when the DC motor 7 is driven to the left direction.

The capacitor 943 is the one for deciding the automatic oscillating frequency of PWM (pulse width modulation) at the time of driving to the right direction of the DC motor 7.

Similarly, the capacitor 946 is the one for deciding the automatic oscillation of PWM at the time of driving to the left direction of the DC motor 7.

The output terminal of the first comparator 911 is connected to an output terminal of a (+)5 V power supply circuit 902 to be described later through a pull-up resistance 928, also to a first input terminal of a first AND circuit 918, and furthermore to a first input terminal of a second AND circuit 919 through a first NOT circuit 916.

The output terminal of the second comparator 912 is connected to an output terminal of a (+)26 V power supply circuit 901 to be described later through a pull-up resistance 930 and also to a gate of a first power MOS FET element 920.

The first power MOS FET element 920 constructs an upper side intermittent element which PWM-drives the DC motor 7 in the right direction.

Still more, the output terminal of the third comparator 913 is connected to the output terminal of the (+)5 V power supply circuit 902 through a pull-up resistance 929, also to the second input terminal of the second AND circuit 919, and furthermore to the second input terminal of the first AND circuit 918 through a second NOT circuit 917.

The output terminal of the fourth comparator 914 is connected to the (+)26 V power supply circuit 901 through a pull-up resistance 931, and also to a gate of a third power MOS FET element 922.

The third power MOS FET element 922 constructs an intermittent element which PWM-drives the DC motor 7 in the left direction.

The output terminal of aforesaid AND circuit 918 is connected to a gate of a second power MOS FET element 921.

The second power MOS FET element 921 constructs an intermittent element which drives DC motor 7 in the right direction.

In the same way, the output of the second AND circuit 919 is to be impressed to a gate of a fourth power MOS FET element 923.

The fourth power MOS FET element 923 constructs an intermittent element which drives the DC motor 7 in the left direction.

These first to the fourth power MOS FET elements 920-923 construct a bridge circuit, the drains of the first and third power MOS FET elements 920 and 922 being connected to the positive electrode of the battery 10, while the sources of the second and fourth power MOS FET elements being earthed.

The junction of the source of the first power MOS FET element 920 with the drain of the fourth power MOS FET element 923 is connected to one end of the DC motor 7.

The source of the third power MOS FET element 922 and the drain of the second power MOS FET element 921 are connected to the junction of the resistance 944 with the resistance 960.

Aforesaid resistance 960 is a resistance for limiting current of the DC motor 7, a relay 961 being connected in parallel to the resistance 960.

The relay 961 is composed of a normal open contact 961a and a drive coil 961b to construct a switching element. The normal open contact 961a is connected to the resistance 960 in parallel, the drive coil 961b being inserted to a place between an output terminal of a fifth comparator 953 and an input terminal which connects the key switch 11.

The drive coil 961b is connected to a diode 970 in parallel. The diode 970 is the one for absorbing surge.

The input terminal which connects aforesaid key switch 11 is connected to input terminals of (+)26 V power supply circuit 901 and (+)5 V power supply circuit 902.

In addition, marks of black dot (●) in FIG. 2 show that the output terminal of the (+)26 V power supply circuit 901 is connected, and marks of while dot () show that the output terminals of the (+)5 V power supply circuit 902 are connected.

Figure 4:
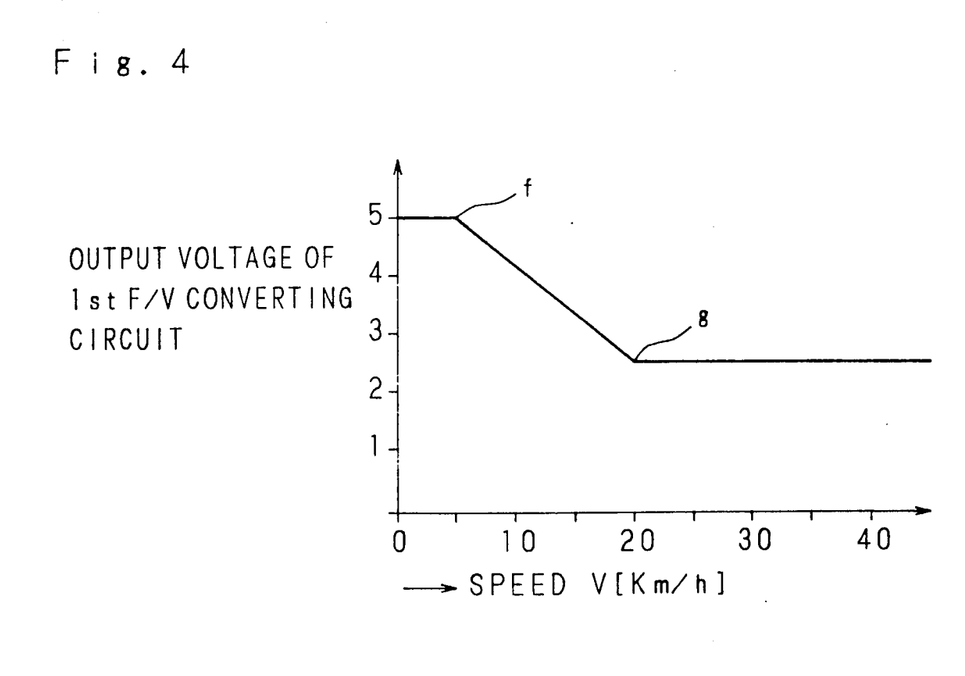
FIG. 4 is an output characteristic diagram of an F/V converting circuit in the control unit shown in FIG. 2.

Still more, the output of the vehicle speed sensor 12 is to be outputted to a first F/V (frequency/voltage) converting circuit 950. The first F/V converting circuit 950, having an output characteristic as shown in FIG. 4 to be described later, inputs a vehicle speed signal from the vehicle speed sensor 12, and supplies (+) side power source voltages of the right potentiometer 3d and the left potentiometer 3e, also supplies the (+) side power source voltage of the resistances 924 and 926. In addition, it supplies the output voltage thereof to (−) side input terminal of the fifth comparator 953. To the (+) side input terminal of the fifth comparator 953, divided voltage of the resistances 951 and 952 are given, the resistances 951 and 952 being series-connected between the output terminal of the (+)5 V power supply circuit 902 and the earth.

Aforesaid vehicle speed sensor 12, F/V converting circuit 950, resistances 951 and 952, and the third comparator 953 construct a vehicle speed judging circuit which judges whether or not the detected vehicle speed is higher than the predetermined vehicle speed (20~50 Km/h).

Figure 3:
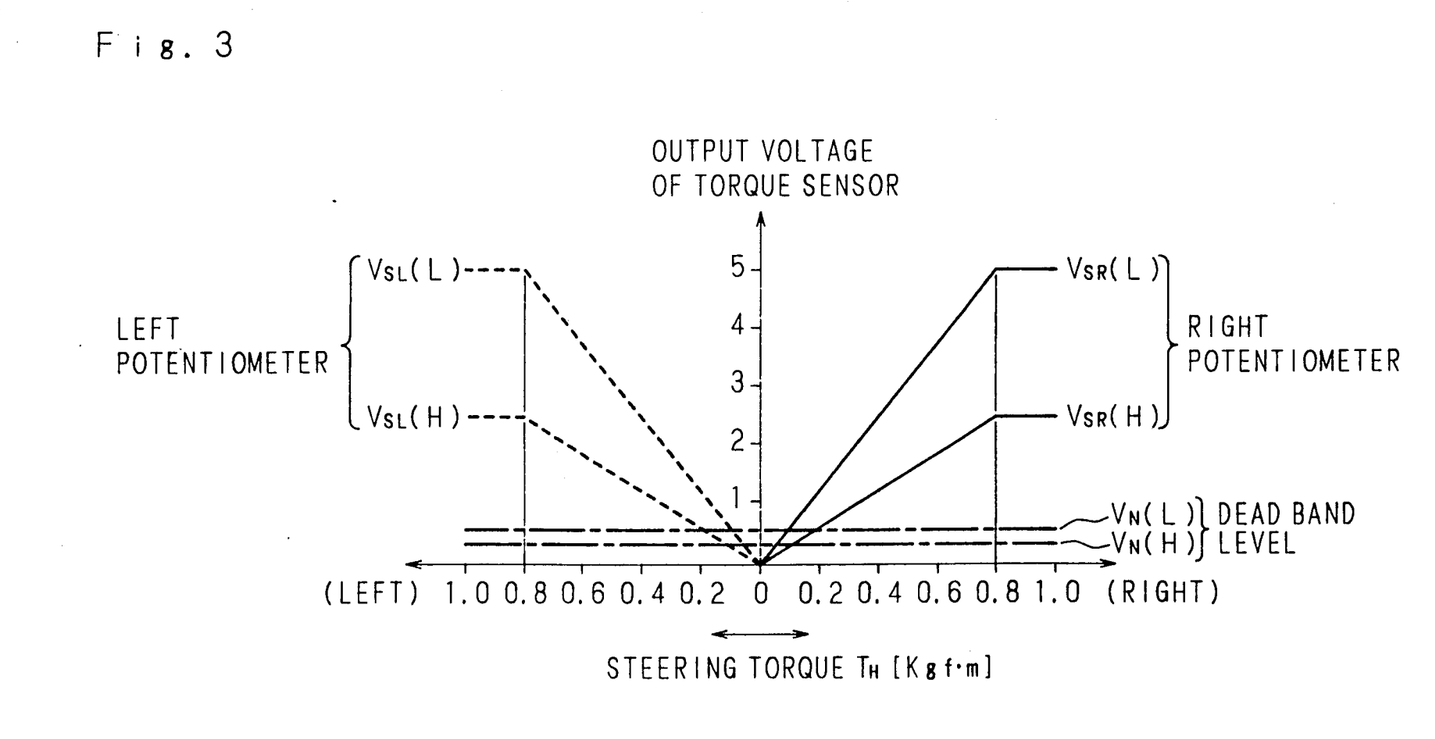
FIG. 3 is an output voltage characteristic diagram of a right potentiometer and a left potentiometer.

FIG. 3 is an output voltage characteristic drawing of aforesaid right potentiometer 3d and left potentiometer 3e, and FIG. 4 is an output characteristic drawing of the first F/V converting circuit 950.

Next, explanation will be given on the operation referring to FIG. 1~FIG. 4.

At first, in starting the engine, when the key switch 11 is ON, 12 V power source is supplied to the (+)26 V power supply circuit 901 and (+)5 V power supply circuit 902 from the battery 10, thereby actuating the control unit 9.

At this time, as the vehicle is stopped, aforesaid vehicle speed sensor 12 outputs a signal which corresponds to 0 km/h.

Accordingly, the F/V converting circuit 950, as shown in FIG. 4, outputs maximum output voltage (about 5 V), the output voltage being supplied as the (+) side power source voltage of the right potentiometer 3d and left potentiometer 3e.

In addition, the output voltage is supplied as the power source voltage to the resistances 924 and 926 at the same time.

At this time, as the output voltage of the F/V converting circuit 950 is higher than the divided voltage of the resistances 951 and 952 for dividing, the fifth comparator 953 outputs an "L" signal.

Accordingly, the drive coil 961b of the relay 961 is driven, the normal open contact 961a thereof closes, and the resistance 960 for limiting motor current is short-circuited, thereby the motor current flows without being limited.

When a driver gives turning force to the steering wheel 1 in the above condition, the torque sensor 3, corresponding to the turning force, outputs voltage in the characteristic as shown in FIG. 3.

In other words, in the state that the steering torque is acted upon neither the left nor the right, both the output voltages of the right potentiometer 3d and left potentiometer 3e become 0 V.

Next, when the steering torque is increased in the right direction, the right potentiometer 3d gradually increases the output voltage, and when the steering torque exceeds about 0.8 kgm, the output voltage becomes 5 V and is saturated, but the output voltage of the left potentiometer 3e is not varied, that is, it remains 0 V.

Now, when the steering torque is increased in the left direction, the left potentiometer 3e gradually increases the output voltage, and when the steering torque exceeds about 0.8 kgm, the output voltage becomes 5 V and is saturated, but the output voltage of the right potentiometer 3d is not varied, that is, it remains 0 V.

Accordingly, when the steering torque is in the right direction, the torque signal voltage outputted by the right potentiometer 3d of the torque sensor 3 is inputted to the (+) side input terminal of the first comparator 911 and the second comparator 912 of the control unit 9.

At this time, when the output voltage of aforesaid right potentiometer 3d exceeds the divided voltage of the resistances 924 and 925, aforesaid first comparator 911 outputs "H".

But as the voltage is not impressed to the DC motor 7, the divided voltage of the resistances 941 and 942 is low, the second comparator 912 outputting "H".

On the other hand, as the output voltage of the left potentiometer 3e is 0 V, both the third comparator 913 and the fourth comparator 914 output "L".

Accordingly, as the first NOT circuit 916 outputs "L" and the second NOT circuit 917 "H", the first AND circuit 918 outputs "H" and the second AND circuit "L" respectively.

Receiving these outputs, the first power MOS FET element 920 and the second power MOS FET element 921 are driven to be ON.

When the first power MOS FET element 920 and the second power MOS FET element 921 are ON, the voltage from the battery 10 is impressed to the DC motor 7 through the first power MOS FET element 920 and the second MOS FET element 921.

Accordingly, to the resistances 941 and 942, the voltage of the DC motor 7 is impressed, and the divided voltage of the resistances 941 and 942 is risen by time constant set by the capacitor 943 in a manner of exponential function.

When this electric potential exceeds the (+) side electric potential of the second comparator 912, that is, the output voltage of the right potentiometer 3d, the output of the first comparator 911 remains "H" and only the output of the second comparator 912 is "L", the first power MOS FET element 920 being OFF.

When the first power MOS FET element 920 is OFF, the divided voltage of the resistances 941 and 942 is dropped by time constant set by the capacitor 943 in a manner of exponential function.

When this electric potential is below the (+) side potential of the second comparator 912, that is, the output voltage of the right potentiometer 3d, the second comparator 912 repeats such operation as to output "H" in order to control the voltage to be impressed to the DC motor 7 to be the value corresponding to the ratio of the resistances 941 and 942 for dividing of the voltage of aforesaid right potentiometer 3d.

Accordingly, current, determined by the controlled voltage as above mentioned and inner electromotive force corresponding to the rotation speed of the DC motor 7, flows through the DC motor 7 and the DC motor 7 generates the assist torque in the right direction, thereby the steering torque in the right direction being light.

The steering torque in the left direction also becomes light as the DC motor 7 is controlled by the reverse operation to the above, so the detailed explanation will be omitted.

Next, explanation will be given on the case where the vehicle speed gradually increases.

When the output voltage of aforesaid F/V converting circuit 950 has such a characteristic that it gradually decreases when it exceeds the vehicle speed 0 km/h ~ f point (2.5 ~ 10 km/h) in the characteristic shown in FIG. 4, and it saturates when it exceeds g point (15 ~ 25 km/h).

Accordingly, the output characteristics of the right potentiometer 3d and the left potentiometer 3e against the vehicle speed and aforesaid dead zone level are like the one shown in FIG. 3.

At first, when the vehicle speed is below the f point, the output characteristic curve of the right potentiometer 3d is the curve ($V_{SR(L)}$) whose gradient is the largest, the output characteristic curve of the left potentiometer 3e is the curve ($V_{SL(L)}$) whose gradient is also the largest, and the dead zone level is the highest level ($V_{N(L)}$).

Furthermore, when the vehicle speed increases to exceed aforesaid f point, above-mentioned each characteristic gradually decreases, and when the vehicle speed exceeds the g point, the output characteristic curve of the right potentiometer 3d is the curve ($V_{SR(H)}$) whose gradient is the smallest, the output characteristic curve of the left potentiometer 3e is the curve ($V_{SL(H)}$) whose gradient is also the smallest, and the dead zone level is the lowest level ($V_{N(H)}$), thereupon the output voltage being saturated.

Although steering load decreases as the vehicle speed increases, motor current against the steering torque also decreases, thereby no unduly light, or optimum steering feeling can be realized.

On the other hand, when the vehicle speed increases to exceed the predetermined value (20 ~ 50 km/h), the output of the F/V converting circuit 950 falls below the divided voltage of the resistances 951 and 952 for dividing, thereby the fifth comparator 953 outputs an "H" signal, whereby the drive coil 961b of the relay 961 is shut down, the normal open contact 961a thereof opens, and the resistance 960 is inserted in series to the DC motor 7.

Operation of the apparatus, in such a situation, in the case where something abnormal is generated will be explained in the following.

At first, even when the torque sensor 3 is in trouble, potentiometer itself generating noise, and failures such as contact failure, disconnection and ground fault on the way of the wiring being generated, the apparatus of the invention, as being provided with respective steering torque sensors for exclusive use of the right and the left, has less possibility to output in the opposite direction even if difference is created in each sensor level, while the conventional apparatus has possibility to output a torque signal in the opposite direction against a driver's will.

Secondly, while the right potentiometer 3d outputs the right direction torque signal, even if the left potentiometer 3e outputs the left direction torque signal at the same time by some reason, both the first AND circuit 918 and the second AND circuit 919 output "L" signals, leading the second power MOS FET element 921 and the fourth power MOS FET element 923 to be OFF, as both the first NOT circuit 916 and the second NOT circuit 917 in the control unit 9 output "L" signals.

Accordingly, the apparatus of the invention is a highly reliable apparatus, as the DC motor 7 is driven in neither the right nor left directions, and the steering wheel 1, which becomes heavy though, does not rotate in the opposite direction against the driver's will.

Thirdly, while the vehicle runs at the speed higher than aforesaid predetermined value, even if DC motor 7 is driven independently although the torque signal is not in the state of driving, or is driven in the opposite direction against the driver's will by deterioration or destruction of various kinds of the built-in elements of aforesaid control unit 9 by some reason, extremely large current does not flow, thereby large assist torque not being generated, as the current is limited by the resistance 960 for limiting motor current, which is inserted in series to the DC motor 7. Accordingly, it is highly possible for the driver to correct the steering operation or to avoid the danger, as steering wheel is not oversteered because steering torque is not too light, and big force is not generated even if the steering wheel is to turn freely or to turn in the opposite direction.

As mentioned above, by inserting a resistance for limiting current to the electric motor in series by the output of the vehicle speed judging circuit for judging more than the predetermined vehicle speed, the apparatus according to the embodiment is so constructed as not to flow large current, even in the case where something abnormal is created in high speed running by some reason, thereby excess current is to flow in the same direction, current is to flow even in neutral state, or current is to flow in the opposite direction. Accordingly, since the torque generated by the electric motor is small and the steering wheel is not be oversteered, there is a high possibility that the driver find it easier to correct the steering operation and to avoid a danger, thereby the highly reliable apparatus can be provided.

Next, explanation will be given on another embodiment of the invention. In aforesaid embodiment, the motor current is controlled corresponding to the vehicle speed, and the motor current is controlled by the resistance when the vehicle runs at high speed. Accordingly when the vehicle speed sensor is in trouble, there is a fear that malfunction is created. Accordingly, in this embodiment, the motor current is controlled corresponding to the vehicle speed, and the motor current is limited when the number of rotations of the engine becomes high, thereby the current flowing to the motor being limited even when something abnormal is generated at the vehicle speed sensor.

Figure 5:
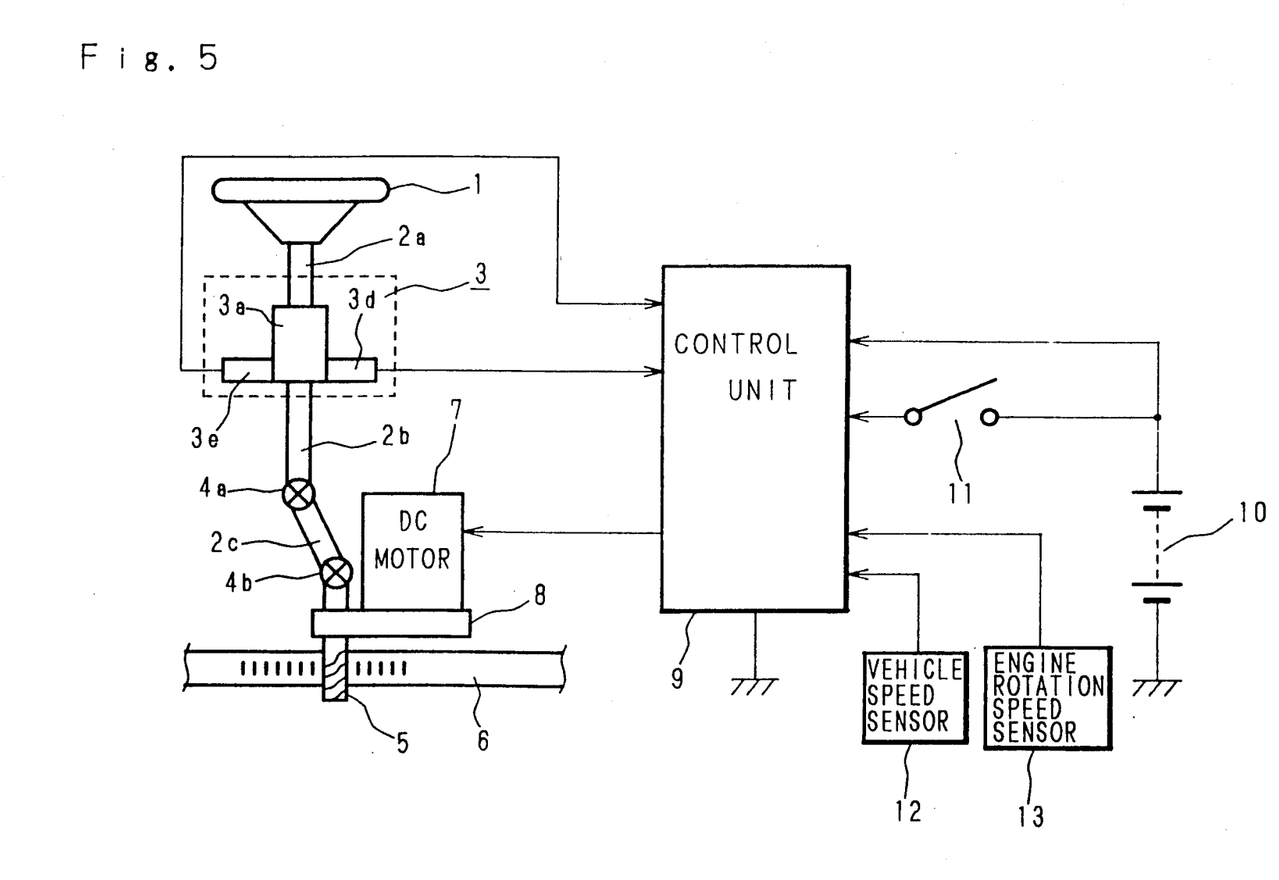
FIG. 5 is a schematic diagram of a motor driven power steering apparatus of another embodiment.

FIG. 5 is a schematic block diagram of a motor driven power steering apparatus of another embodiment, and the difference between the figure and FIG. 1 is only that the output of an engine rotation speed sensor 13 is given to the control unit 9.

Figure 6:
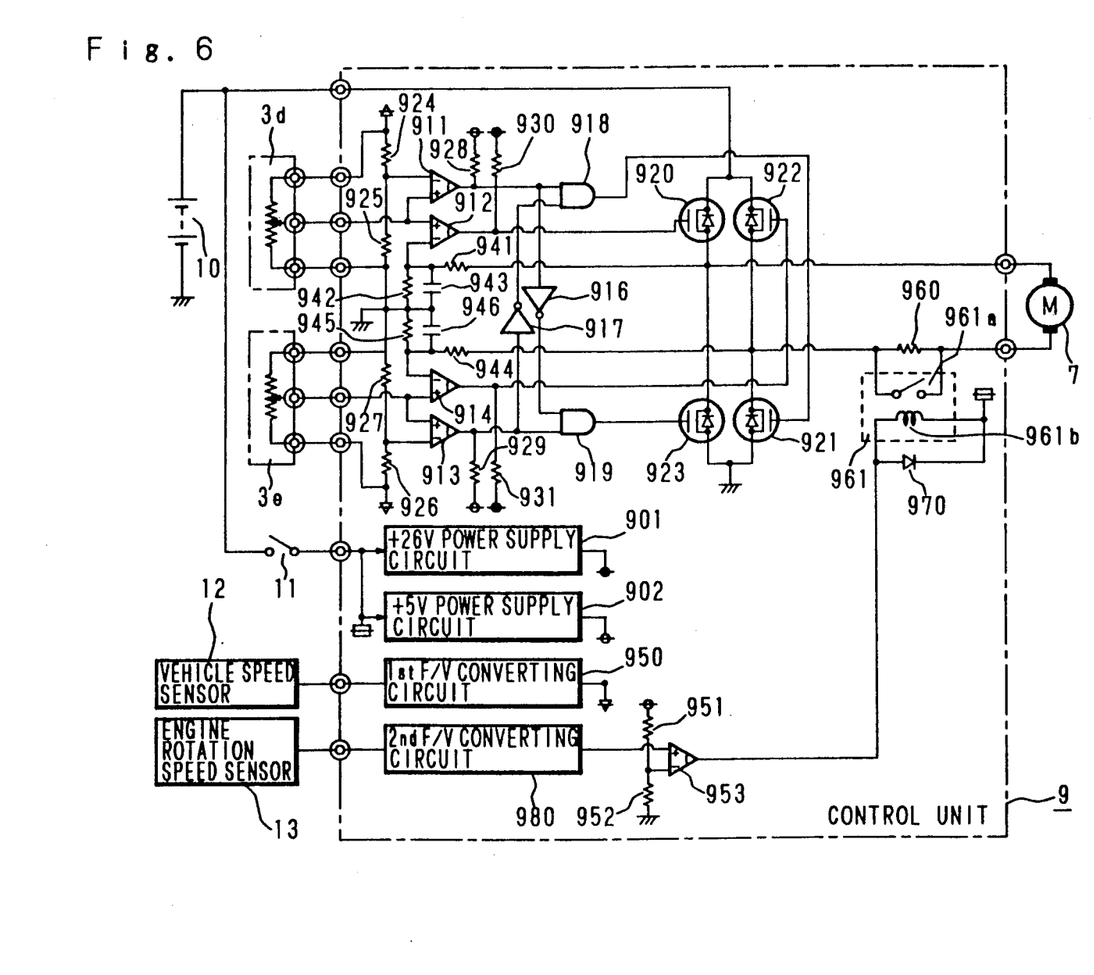
FIG. 6 is a circuit diagram showing a precise construction of the inside of another embodiment.

FIG. 6 is a circuit diagram showing the precise inner construction of the control unit 9 shown in FIG. 5. In FIG. 2, the output voltage of the first F/V converting circuit 950 is given to the (−) side input terminal of the fifth comparator 953, but in FIG. 6, the output voltage of a second F/V converting circuit 980 is given the (−) side input terminal of the fifth comparator 953.

The second F/V converting circuit 980 has a characteristic that the output voltage thereof increases as the engine rotation speed increases, with an engine rotation speed signal of aforesaid engine rotation speed sensor 13 being as an input.

The engine rotation speed judging circuit, which is a running state judging means, is composed of the engine rotation speed sensor 13, second F/V converting circuit 980, resistances 951 and 952, and fifth comparator 953.

Next, explanation will be given on the operation referring to FIG. 3 through FIG. 6. At first, in starting the engine, when the key switch 11 is ON, 12 V power supply is supplied from the battery 10 to the (+) 26 V power supply circuit 901 and (+) 5 V power supply circuit 902, to actuate the control unit 9.

At this time, as the vehicle is stopped, aforesaid vehicle speed sensor 12 outputs a signal corresponding to 0 km/h.

Accordingly, the first F/V converting circuit 950 outputs the maximum output voltage (about 5 V) as shown in FIG. 4, the output voltage being supplied as the (+) side power source voltage of the right potentiometer 3d and the left potentiometer 3e.

At this time, as the output voltage of the second F/V converting circuit 980 is lower than divided voltage of the resistances 951 and 952 for dividing, the fifth comparator 953 outputs the "L" signal, the drive coil 961b of the relay 961 is driven, the normal open contact 961a closes, and the resistance 960 for limiting the motor current is short-circuited, thereby the motor current flowing without being limited.

When the driver gives turning force on the steering wheel 1 in this state, the torque sensor 3 outputs the voltage corresponding to the turning force with the characteristic shown in FIG. 3.

In other words, in the state that the steering torque is acted upon neither the right nor the left, both the output voltages of the right potentiometer 3d and the left potentiometer 3e are 0 V.

Next, when the steering torque is increased in the right direction, the right potentiometer 3d gradually increases the output voltage, and when it exceeds about 0.8 kgm, the output voltage becomes 5 V and is saturated, but the output voltage of the left potentiometer 3e is not varied, that is, it remains 0 V.

Now, when the steering torque is increased in the left direction, the left potentiometer 3e gradually increases the output voltage, and when it exceeds about 0.8 kgm, the output voltage becomes 5 V and is saturated, but the output voltage of the right potentiometer 3d is not varied, that is, it remains 0 V.

Accordingly, when the steering torque is in the right direction, the torque signal voltage outputted by the right potentiometer 3d of the torque sensor 3 is inputted to the (+) side input terminals of the first comparator 911 and the second comparator 912 of the control unit 9.

At this time, when the output voltage of aforesaid right potentiometer 3d exceeds the divided voltage of the resistances 924 and 925, aforesaid first comparator 911 outputs "H".

But as the voltage is not impressed to the DC motor 7, the divided voltage of the resistances 941 and 942 is low, the second comparator 912 outputting "H".

On the other hand, as the output voltage of the left potentiometer 3e is 0 V, both the third comparator 913 and the fourth comparator 914 output "L".

Accordingly, as the first NOT circuit 916 outputs "L" and the second NOT circuit 917 outputs "H", the first AND circuit 918 outputs "H" and the second AND circuit 919 outputs "L".

Receiving these outputs, the first power MOS FET element 920 and the second power MOS FET element 921 are driven to be ON.

When the first power MOS FET element 920 and the second power MOS FET element 921 are ON, the voltage from the battery 10 is impressed to the DC motor 7 through the first power MOS FET element 920 and the second MOS FET element 921.

Accordingly, to the resistances 941 and 942, the voltage of the DC motor 7 is impressed, and the divided voltage of the resistances 941 and 942 is risen by time constant set by the capacitor 943 in a manner of exponential function.

When this electric potential exceeds the (+) side electric potential of the second comparator 912, that is, the output voltage of the right potentiometer 3d, the output of the first comparator 911 remains "H" and only the output of the second comparator 912 is "L", the first power MOS FET element 920 being OFF.

When the first power MOS FET element 920 is OFF, the divided voltage of the resistances 941 and 942 is dropped by time constant set by the capacitor 943 in a manner of exponential function.

When this electrical potential is below the (+) side electric potential of the second comparator 912, that is, the output voltage of the right potentiometer 3d, the second comparator 912 repeats such operation as to output "H" in order to control the voltage to be impressed to the DC motor 7 to be the value corresponding to the ratio of the resistances 941 and 942 for dividing of the output voltage of aforesaid right potentiometer 3d.

Accordingly, the current, determined by the controlled voltage as above mentioned and the inner electromotive force corresponding to the rotation speed of the DC motor 7, flows through the DC motor 7, and the DC motor 7 generates the assist torque in the right direction, thereby the steering torque in the right direction being light.

The steering torque in the left direction also becomes light as the DC motor 7 is controlled by the reverse operation as the above, so the detailed explanation will be omitted.

Next, explanation will be given on the case where the vehicle speed gradually increases.

The output voltage of the first F/V converting circuit 950 has such a characteristic that, when it exceeds the vehicle speed 0 km/h ~ f point (2.5 ~ 10 km/h) in the characteristic shown in FIG. 4, it gradually decreases, and when it exceeds g point (15 ~ 25 km/h), it saturates.

Accordingly, the output characteristics of the right potentiometer 3d and the left potentiometer 3e against the vehicle speed and aforesaid dead zone level are like the one shown in FIG. 3.

At first, when the vehicle speed is below the f point, the output characteristic curve of the right potentiometer 3d is the curve ($V_{SR(L)}$) whose gradient is the largest, the output characteristic curve of the left potentiometer 3e is the curve ($V_{SL(L)}$) whose gradient is also the largest, and the dead zone level is the highest level ($V_{N(L)}$).

Furthermore, when the vehicle speed increases to exceed aforesaid f point, above-mentioned each characteristic gradually decreases, and when the vehicle speed exceeds the g point, the output characteristic curve of the right potentiometer 3d is the curve ($V_{SR(H)}$) whose gradient is the smallest, the output characteristic curve of the left potentiometer 3e is the curve ($V_{SL(L)}$) whose gradient is also the smallest, and the dead zone level is the lowest level ($V_{N(H)}$), thereupon the output voltage being saturated.

Accordingly, the motor current against the steering torque as well as the steering load decreases, as the vehicle speed increases, however, thereby not too much light, or optimum steering feeling can be realized.

On the other hand, when the engine rotation speed increases to exceed the predetermined value (1,500~2,500 rpm), as the output of the second F/V converting circuit 980 exceeds the divided voltage of the resistances 951 and 952 for dividing, the fifth comparator 953 outputs the "H" signal and the drive coil 961b of the relay 961 is shut down, thereby the normal open contact 961a opening, and the resistance 960 being inserted in series to the DC motor 7.

Explanation will be given on the operation in the case where something abnormal is generated in the apparatus in this situation.

At first, even when the torque sensor 3 is in trouble, potentiometer itself generating noise, and failures such as contact failure, disconnection and ground fault on the way of the wiring being generated, the apparatus of the invention, as being provided with respective steering torque sensors for exclusive use of the right and the left, that is, one right potentiometer 3d and one left potentiometer 3e, has less possibility to output in the opposite direction even if difference is created in each sensor level, while the conventional apparatus has possibility to output a torque signal in the opposite direction against a driver's will.

Secondly, while the right potentiometer 3d outputs the right direction torque signal, even if the left potentiometer 3e outputs the left direction torque signal at the same time by some reason, both the first AND circuit 918 and the second AND circuit 918 output "L" signals as both the first NOT circuit 916 and the second NOT circuit 917 in the control unit 9 output "L" signals.

Thereby, the second power MOS FET element 921 and the fourth power MOS FET element 923 are OFF. Accordingly, the apparatus of the invention is a highly reliable apparatus, as the DC motor 7 is driven in neither the right not left directions, and the steering wheel 1, which becomes heavy though, does not rotate in the opposite direction against the driver's will.

Thirdly, while the vehicle runs at the speed higher than aforesaid predetermined value, even if aforesaid vehicle speed signal is not inputted to the control unit 9, the DC motor 7 is driven independently although the torque signal is not in the state of driving or is driven in the opposite direction against the driver's will by deterioration or destruction of various kinds of the built-in elements of the control unit 9 by some reason, current is limited by the resistance 960 for limiting motor current which is inserted in series to the DC motor 7, by detecting the degree of the engine rotation speed.

Accordingly, extremely large current does not flow and large assist torque is not generated. Thereby, it is highly possible for the driver to correct the steering operation or to avoid the danger, as steering wheel is not oversteered because steering torque is not too light, and big force is not generated even if the steering wheel is to turn independently or to turn in the opposite direction.

In addition, in this embodiment, although explanation was given on the power steering apparatus of vehicle speed induction type being provided with the vehicle speed sensor other than the engine rotation speed sensor, the vehicle speed sensor is not necessarily provided. The present invention is also applicable to the power steering apparatus of rotation speed induction type by the engine rotation speed sensor.

As mentioned above, by inserting a resistance for limiting current to the electric motor in series by the engine rotation speed judging circuit for judging whether or not the rotation speed thereof is more than predetermined engine rotation speed, even in the case where something abnormal is created in high speed running by some reason, thereby excess current is to flow in the same direction, or current is to flow even in neutral state, or current is to flow in the opposite direction. Accordingly, since the torque generated by the electric motor is small and the steering wheel is not oversteered, there is a high posibility that the driver find it easier to correct the steering operation and to avoid a danger, thereby the highly reliable apparatus can be provided.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A motor driven power steering apparatus, comprising:
   a torque sensor (3) for detecting a steering torque applied to a steering wheel (1) of a vehicle;
   an electric motor (7) for assisting steering power corresponding to the steering torque detected by said torque sensor;
   running state judging means for judging a running state condition of said vehicle;
   current limiting means (960) connected in series in a current supply path of said electric motor, for limiting a current supplied to said electric motor;
   a switching element (961) connected in parallel with said current limiting means for short circuiting said current limiting means; and
   controlling means for controlling the opening and closing of said switching element in accordance with the running state condition detected by said running state judging means such that said switching element is opened when the detected running state condition exceeds a predetermined value to limit the current supplied to said electric motor and attendantly the steering assist power provided thereby.

2. A motor driven power steering apparatus as set forth in claim 1, wherein said running state judging means comprise vehicle speed detecting means (12) for detecting a speed of said vehicle and comparing means for comparing the detected vehicle speed with a predetermined value thereof, and judges said vehicle to be in a specific running state when the detected vehicle speed exceeds said predetermined value.

3. A motor driven power steering apparatus as set forth in claim 1, wherein said running state judging means comprises rotation speed detecting means (13) for detecting a rotation speed of an engine of said vehicle and comparing means for comparing the detected rotation speed with a predetermined value thereof, and judges said vehicle to be in a specific running state when the detected rotation speed exceeds said predetermined value.

4. A motor driven power steering apparatus as set forth in claim 1, wherein said current limiting means comprises a resistance.

* * * * *